US012634667B2

(12) United States Patent
Törnkvist et al.

(10) Patent No.: US 12,634,667 B2
(45) Date of Patent: May 19, 2026

(54) METHODS AND SYSTEMS FOR CHARGING INCLUDING A SERVICE USAGE BASED CHARGING TRIGGER CONDITION

(71) Applicant: Telefonaktiebolaget LM Ericsson (publ), Stockholm (SE)

(72) Inventors: Robert Törnkvist, Karlskrona (SE); Lakshmi Narasimham Bhagavathula, Karlskrona (SE)

(73) Assignee: TELEFONAKTIEBOLAGET ERICSSON LM (PUBL), Stockholm (SE)

( * ) Notice: Subject to any disclaimer, the term of this patent is extended or adjusted under 35 U.S.C. 154(b) by 345 days.

(21) Appl. No.: 18/272,375

(22) PCT Filed: Jul. 1, 2021

(86) PCT No.: PCT/EP2021/068227
§ 371 (c)(1),
(2) Date: Jul. 14, 2023

(87) PCT Pub. No.: WO2022/152409
PCT Pub. Date: Jul. 21, 2022

(65) Prior Publication Data
US 2024/0073654 A1 Feb. 29, 2024

Related U.S. Application Data

(60) Provisional application No. 63/138,026, filed on Jan. 15, 2021.

(51) Int. Cl.
*H04L 12/14* (2024.01)
*H04M 15/00* (2024.01)
(Continued)

(52) U.S. Cl.
CPC ............... *H04W 4/24* (2013.01); *H04W 4/50* (2018.02); *H04W 80/08* (2013.01)

(58) Field of Classification Search
CPC ......... H04W 4/24; H04W 4/50; H04W 80/08; H04M 15/61; H04M 15/62; H04M 15/64;
(Continued)

(56) References Cited

U.S. PATENT DOCUMENTS

2014/0273933 A1   9/2014  Sharma et al.
2020/0100075 A1*  3/2020  Chai ................. H04M 15/8228

FOREIGN PATENT DOCUMENTS

EP            3499927 A1     6/2019

OTHER PUBLICATIONS

International Search Report and Written Opinion of the International Searching Authority, PCT/EP2021/068227, mailed Oct. 12, 2021, 12 pages.
(Continued)

*Primary Examiner* — Joseph E Dean, Jr.
(74) *Attorney, Agent, or Firm* — Sage Patent Group

(57) ABSTRACT

A method for charging in a radiocommunication system is described. A charging data request message associated with a UE is transmitted and, in response thereto, a charging data response message is received including one or more charging triggers, wherein at least one of the one or more charging triggers is of a usage reporting category and is associated with a first charging event. Another charging data request is transmitted after both the first charging event occurs and usage of an associated service has been requested by the UE.

24 Claims, 7 Drawing Sheets

300

Transmitting, by a node in the radiocommunication system, a first charging data request message associated with a UE

302

Receiving, at the node in the radiocommunication system and in response to the first charging data request message, a charging data response message including one or more charging triggers, wherein at least one of the one or more charging triggers is of a usage reporting category and is associated with the first charging event

304

Transmitting, by the node in the radiocommunication system, a second charging data request after both the first charging event occurs and usage of an associated service has been requested by the UE

(51) Int. Cl.
H04W 4/24 (2018.01)
H04W 4/50 (2018.01)
H04W 80/08 (2009.01)

(58) Field of Classification Search
CPC .... H04M 15/66; H04M 15/70; H04M 15/725;
H04L 12/14; H04L 12/1403; H04L
12/1407; H04L 12/1432
See application file for complete search history.

(56) References Cited

OTHER PUBLICATIONS

3GPP TS 32.290 v15.7.0 (Dec. 2020); 3rd Generation Partnership Project; Technical Specification Group Services and System Aspects; Telecommunication management; Charging management; 5G system; Services, operations and procedures of charging using Service Based Interface (SBI) (Release 15), 32 pages.

3GPP TS 29.244 v16.6.0 (Dec. 2020); 3rd Generation Partnership Project; Technical Specification Group Core Network and Terminals; Interface between the Control Plane and the User Plane Nodes; Stage 3 (Release 16), 318 pages.

3GPP TS 32.255 v17.0.0 (Dec. 2020); 3rd Generation Partnership Project; Technical Specification Group Services and System Aspects; Telecommunication management; Charging management; 5G data connectivity domain charging; stage 2 (Release 17), 119 pages.

3GPP TS 32.290 v17.0.0 (Dec. 2020); 3rd Generation Partnership Project; Technical Specification Group Services and System Aspects; Telecommunication management; Charging management; 5G system; Services, operations and procedures of charging using Service Based Interface (SBI) (Release 17), 37 pages.

3GPP TS 32.291 v16.6.1 (Dec. 2020); 3rd Generation Partnership Project; Technical Specification Group Services and System Aspects; Telecommunication management; Charging management; 5G system, charging service; Stage 3 (Release 16), 131 pages.

* cited by examiner

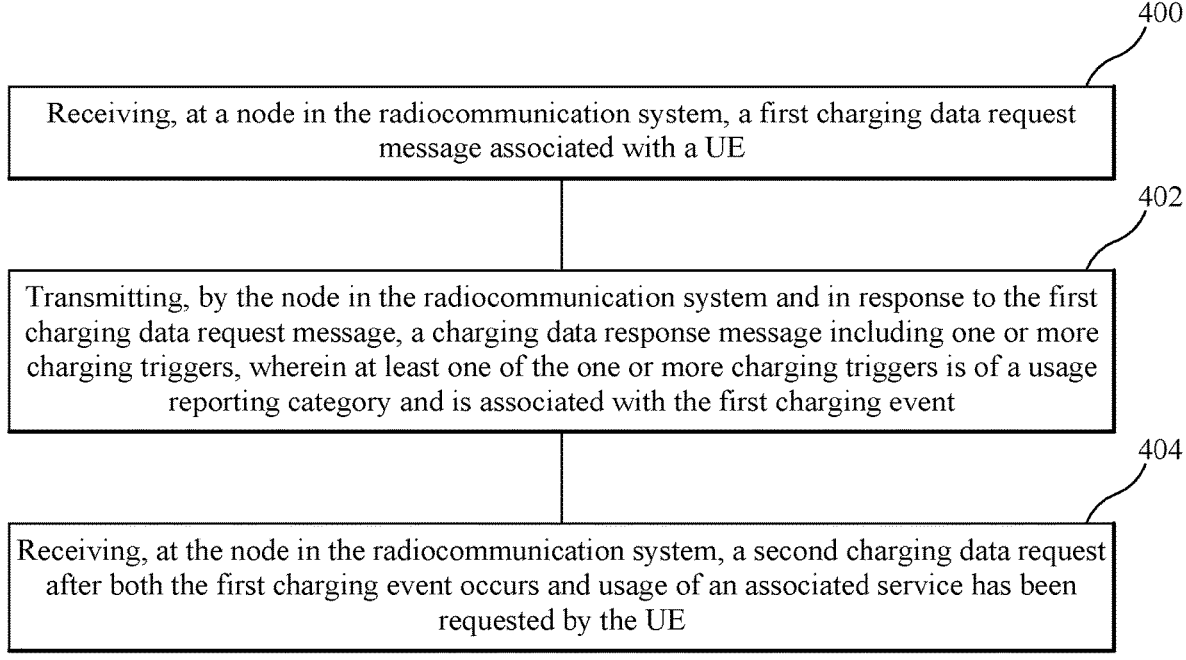

400

Receiving, at a node in the radiocommunication system, a first charging data request message associated with a UE

402

Transmitting, by the node in the radiocommunication system and in response to the first charging data request message, a charging data response message including one or more charging triggers, wherein at least one of the one or more charging triggers is of a usage reporting category and is associated with the first charging event

404

Receiving, at the node in the radiocommunication system, a second charging data request after both the first charging event occurs and usage of an associated service has been requested by the UE

METHODS AND SYSTEMS FOR CHARGING INCLUDING A SERVICE USAGE BASED CHARGING TRIGGER CONDITION

CROSS REFERENCE TO RELATED APPLICATIONS

This application is a 35 U.S.C. § 371 national stage application of PCT International Application No. PCT/EP2021/068227 filed on Jul. 1, 2021, which in turn claims domestic priority to U.S. Provisional Patent Application No. 63/138,026, filed on Jan. 15, 2021, the disclosures and content of which are incorporated by reference herein in their entirety.

TECHNICAL FIELD

The present invention generally relates to communication networks and, more particularly, to mechanisms and techniques for charging systems.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. More recently there are numerous devices, e.g., so called "smart" phones and tablets, which can access communication networks in which the operators of the networks, and other parties, provide many different types of services, applications, etc. Accordingly, there need to be methods and systems for efficiently charging for services, particularly, as service offerings exist in a dynamic environment with expectations of increased volume and new types of services becoming available.

In the current charging framework specified in 3GPP for various network functions (NFs), e.g., the Session Management Function (SMF) and Network Exposure Function (NEF), there are triggers for a number of different type of events connected to SMS and the PDU Session, and prior to that the Packet Gateway (PGW) and Serving Gateway (SGW), which can trigger charging (see, e.g., 3GPP TS 32.290 and 3GPP TS 32.291), such that when such an event occurs the NF can request charging from a charging function (CHF). FIG. 1 illustrates a portion of a 5G network including a plurality of NFs 100 and a CHF 102. The NFs 100 (also sometimes referred to herein as an "NF consumer") include a charging trigger function (CTF) 104 which consumes services from the CHF 102 using the Nchf service.

At some point in time, for a given UE, a decision to request the start of charging is taken by the NF 100, e.g., either based on internal settings or based on polices received from the policy control function (PCF, not shown in FIG. 1). If the charging is session-based there is a need for the CHF 102 to set triggers for what service events the NF 100 shall report usage or request quota from the CHF 102, these are called mid-session triggers.

Some triggers are allowed to be enabled/disabled by the CHF 102. One or more triggers may be enabled by default at the NF consumer 100. In this context, two categories of triggers are identified in TS 32.290/32.291. Specifically, an immediate report category is specified therein which indicates chargeable events for which, when they occur, the current charging counts are closed and sent, together with the charging data generated by the NF consumer 100, towards the CHF 102 in a Request message. New charging counts are then started by the NF consumer 100. A second trigger category specified in these standards is the deferred report category for which chargeable events, when they occur, the current charging counts are closed and stored together with the charging data generated by the NF consumer 100. The stored counts will be sent to the CHF 102 in a next Request message sometime in the future, e.g., every hour. New charging counts are started by the NF consumer 100.

To some extent, these two charging trigger categories provide good flexibility for reporting charging events and charging counts depending on the need of the CHF 102, i.e., does the CHF 102 need to know this charging information immediately for a particular type of event or is this charging information just for post processing such that the CHF 102 can wait until a report is sent. However there are also some problems which cannot be addressed using these two trigger categories. For example, an issue with the immediate report category, is that this trigger category will result in a report being sent to the CHF 102 even if there has not been any service usage before the event and even though there might not be any usage after the event, so this means that just the occurrence of the event will generate a request to the CHF 102. For the deferred report category this is less of an issue, but it still will create a large amount of data being sent over the network for cases where trigger events occur but don't result in the UE actually using a service associated with the event.

To more fully illustrate the problem with the two existing trigger charging categories, consider the following example. Suppose that a subscriber (i.e., a UE) is on the edge between 4G and 5G coverage. As the UE moves, it will frequently switch back and forth between 4G and 5G service. Very often the network operator would like to charge extra for 5G, or at least keep track of the usage in the different radio accesses, which means that the CHF 102 will set a charging trigger for radio access type (RAT) change events.

If CHF 102 sets this RAT trigger to have the deferred reporting category type, then every change associated with a change of the UE moving between the 4G coverage and the 5G coverage will be recorded (stored) in the NF 100, resulting in a large amount of information being stored even if there was no usage of, e.g., the 5G service, by the UE. Alternatively, if the CHF 102 sets this RAT trigger to have the immediate reporting category type, then every change will be reported, resulting in a large number of requests being sent from the NF 100 to the CHF 102, even if there was no usage of, e.g., the 5G service, by the UE.

Thus, there is a need to provide methods and systems that overcome the above-described drawbacks associated with charging in communication networks.

SUMMARY

Embodiments provide various mechanisms to enable charging triggers to generate requests taking into account, at least in part, actual service usage, or a request for service usage, by the UE.

According to an embodiment, a method for charging in a radiocommunication system is described. A charging data request message associated with a UE is transmitted and, in response thereto, a charging data response message is received including one or more charging triggers, wherein at least one of the one or more charging triggers is of a usage reporting category and is associated with a first charging event. Another charging data request is transmitted after both the first charging event occurs and usage of an associated service has been requested by the UE.

According to another embodiment, a node in a radiocommunication system is described. The node includes a processor configured to transmit a first charging data request message associated with a UE and an interface configured to receive, a charging data response message including one or more charging triggers, wherein at least one of the one or more charging triggers is of a usage reporting category and is associated with a first charging event. The processor is further configured to transmit a second charging data request after both the first charging event occurs and usage of an associated service has been requested by the UE.

According to another embodiment, a method for charging in a radiocommunication system is described. A first charging data request message associated with a UE is received. In response a charging data response message including one or more charging triggers is transmitted, wherein at least one of the one or more charging triggers is of a usage reporting category and is associated with a first charging event. Then, a second charging data request is received after both the first charging event occurs and usage of an associated service has been requested by the UE.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 3 and 4 are flowcharts according to embodiments;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with the existing categories of charging triggers in that, under certain scenarios, either too much data is recorded and/or too much signaling across the network occurs for events or changes which do not result in actual service usage. Embodiments described herein provide for a third trigger category type, which shall be called herein the "usage reporting" trigger category type (although those skilled in the art will appreciate that this trigger category type could be identified using any name). The usage reporting trigger category will enable the NF 100 to only record or report if there is actual usage after the trigger condition has occurred. In this context "actual usage" can refer to a request for usage of the service which is associated with the usage reporting trigger or a request for usage of the service coupled with actual usage, e.g., data transfer.

Figure 1:
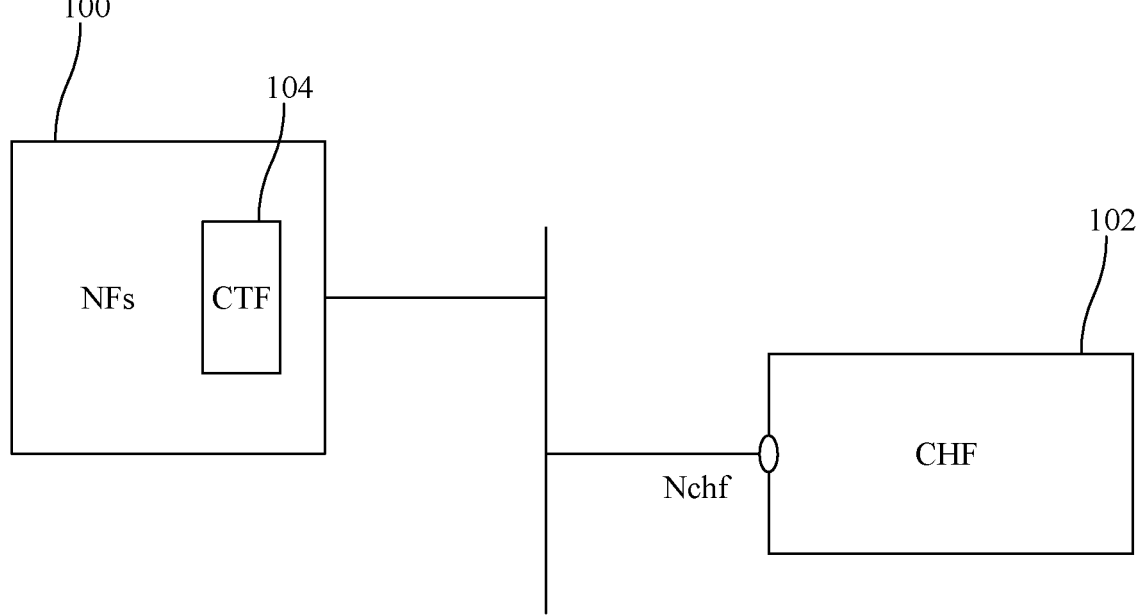
FIG. 1 illustrates an architecture according to an embodiment.
Figure 2A:
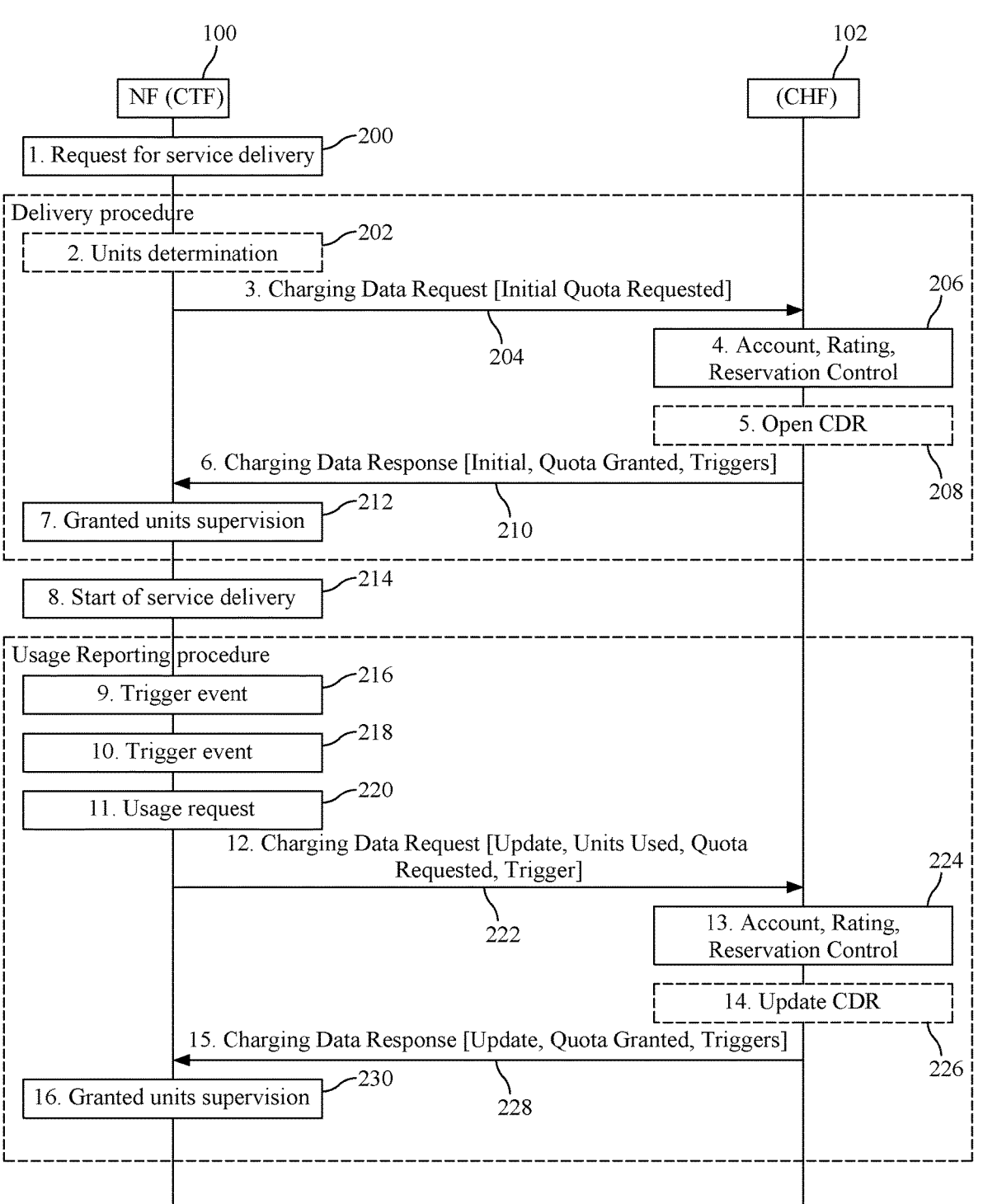
FIGS. 2A and 2B illustrate charging signaling according to an embodiment.
Figure 2B:
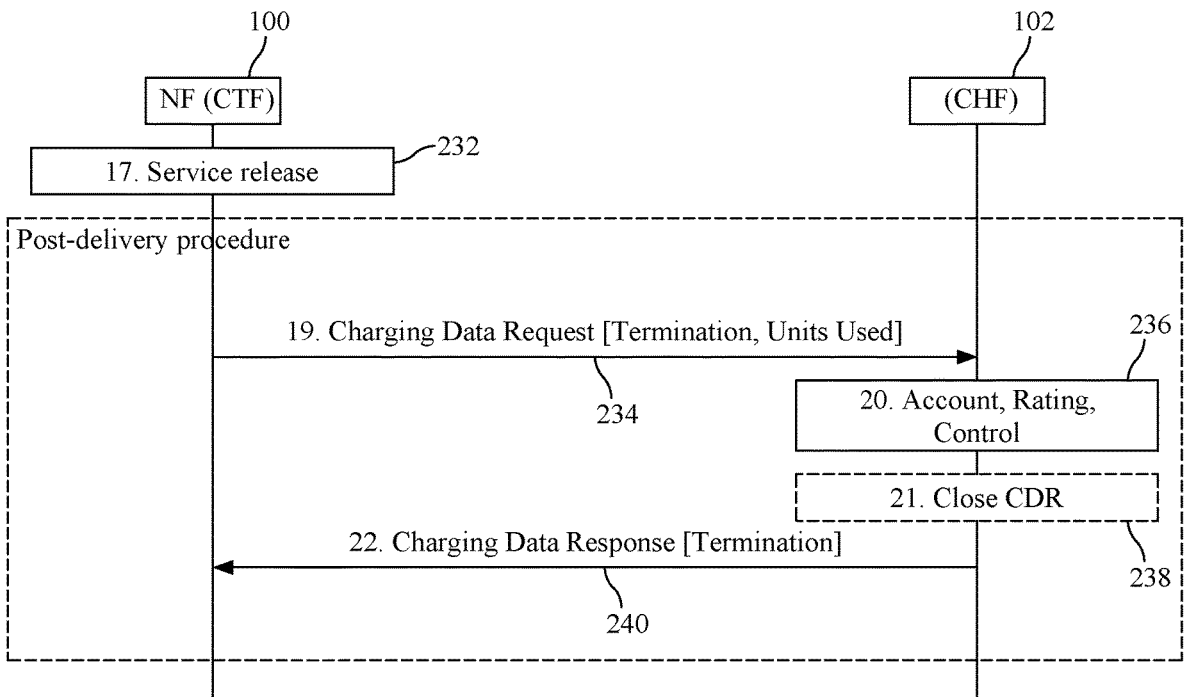

FIGS. 2A and 2B illustrate a signaling embodiment employing at least one trigger having a usage reporting category type. Therein, at step 200, an initial request for session establishment is received in the NF 100 (CTF 104). The service is configured to be authorized by the CHF 102 to start. At step 202, the NF 100 (CTF 104) determines the number of units to be requested depending on the service requested by the UE in a "Decentralized Units Determination" scenario. The NF 100 (CTF 104) sends a Charging Data Request (Initial, Quota Requested) 204 to the CHF 102 for the service to be granted authorization to start, and to reserve the number of units if determined in step 202.

At step 206, the CHF 102 rates the request either based on the number of units requested or on internal unit determination, and checks if corresponding funds can be reserved on the user's account balance. If the account has sufficient funds, the CHF 102 performs the corresponding reservations. At step 208, based on policies, the CHF 102 opens a CDR related to the service. The CHF 102 then sends a Charging Data Response message (Initial, Quota Granted, Triggers) 210 by way of which the CHF 102 grants authorization to NF 100 (CTF 104) for the service to start, the message 210 including the reserved number of units, and the charging triggers. According to this embodiment, at least one of the charging triggers in message 210 has the usage reporting category type described above.

At step 212, the NF 100 (CTF 104) monitors the consumption of the granted units and starts to deliver the content/service based on the reserved number of units at step 214. At step 216, the NF 100 (CTF 104) detects that there is a change in the trigger condition for the trigger which was set by the CHF 102 having the usage reporting category type, e.g., the UE associated with this session has moved from a 4G area of service to a 5G area of service. However, since there thus far has been no usage requested for this service by the UE, the trigger event 216 doesn't result in the NF 100 generating a charging data request message with a report included toward the CHF 102.

At step 218, the NF 100 (CTF. 104) again detects that there is a change in the trigger condition for the trigger which was set by the CHF 102 having the usage reporting category type, e.g., the UE associated with this session has moved from the 5G area of service back to the 4G area of service. However, since there thus far has been no usage requested for this service by the UE, the trigger event 218 also doesn't result in the NF 100 generating a charging data request message with a report included toward the CHF 102.

At step 220, on the other hand, the NF 100 (CTF 104) detects that there has been a request for usage by the UE, i.e., quota consumption, and since there has previously been a change in the trigger condition, e.g., in step 216 and/or 218, a report of used units can be included in a Charging Data Request 222 to be sent as indicated by the usage reporting category type associated with the events which triggered at steps 216 and 218. The Charging Data Request 222 also includes an indication of the trigger which caused the request to be sent and a quota requested for more units to be granted to continue the service. At step 224, the CHF 102 performs the processes related to the receiving the trigger condition, reported usage and the requested reservation, involving a rating entity and the user's account balance. At step 226, based on policies, the CHF 102 updates the CDR with charging data related to the service.

The CHF 102 grants quota to NF 100 (CTF 104) for the service to continue, with a reserved number of units, by sending the Charging Data Response signal 228. Thus, the NF 100 (CTF 104) continues to deliver the content/service based on the granted quota at step 228. At some point in time, as indicated by step 230, the session is released and post-delivery procedures are performed. For example, the NF 100 (CTF 104) sends another Charging Data Request message 224 to the CHF 102, indicating that the session has been terminated and with charging data related to the service termination with the final consumed units. At step 236, the CHF 102 performs the service termination process involving a rating entity and the user's account balance. At step 238, based on policies, the CHF 102 closes the CDR with charging data related to the service termination and the last reported units. Using Charging Data Response message 240, the CHF 102 informs the NF 100 (CTF 104) of the result of the request, i.e., termination.

The foregoing discussion of the embodiment of FIGS. 2A and 2B focuses on an event trigger of the usage reporting category type. However those skilled in the art will appreciate that a session can be provided with one or more different charging events having different trigger category types, e.g., immediate, usage and/or deferred, which category types are summarized in the Table below.

| Enumeration value | Category Description |
| --- | --- |
| IMMEDI-ATE__REPORT | chargeable events for which, when occurring, the charging data generated by the NF Consumer triggers a Charging Event towards the CHF. |
| DEFERRED__RE-PORT | chargeable events for which, when occurring, the charging data generated by the NF Consumer, does not trigger a Charging Event towards the CHF. |
| USAGE__REPORT | chargeable events for which, when occurring together with usage, the charging data generated by the NF Consumer triggers a Charging Event towards the CHF. |

Figure 3:
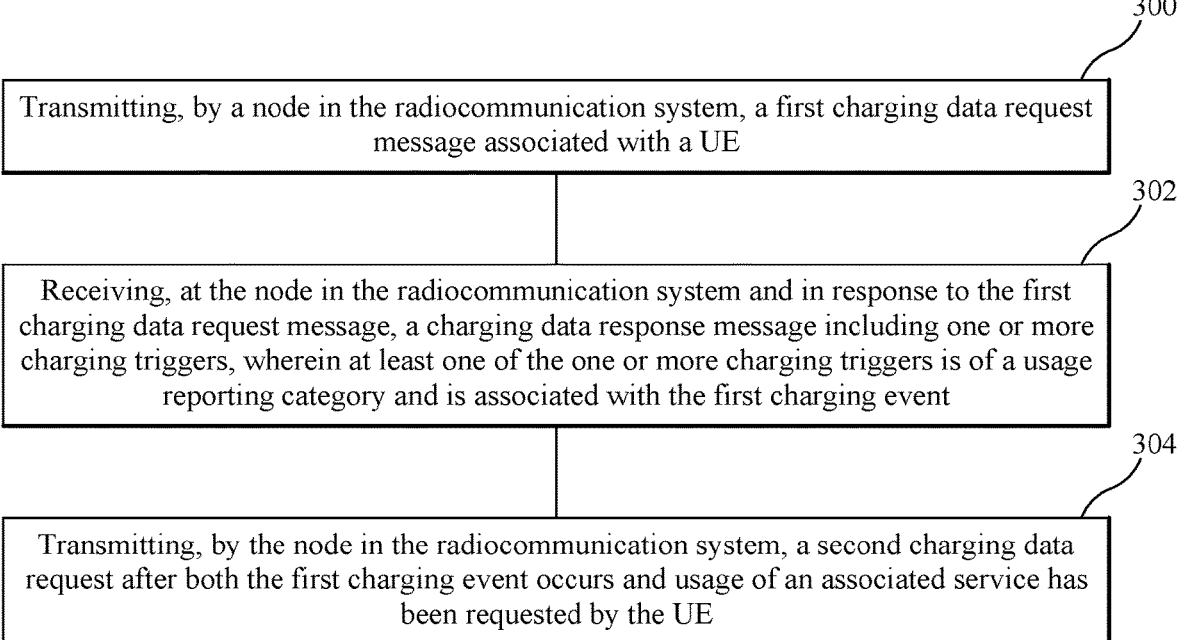

Embodiments can also be expressed as methods, an example of which is provided in the flow chart of FIG. 3 from the perspective of, for example, the NF 100. Therein, a method for charging in a radiocommunication system includes transmitting 300, by a node in the radiocommunication system, a first charging data request message associated with a UE; receiving 302, at the node in the radiocommunication system and in response to the first charging data request message, a charging data response message including one or more charging triggers, wherein at least one of the one or more charging triggers is of a usage reporting category and is associated with a first charging event; and transmitting 304, by the node in the radiocommunication system, a second charging data request after both the first charging event occurs and usage of an associated service has been requested by the UE.

In the embodiment of FIG. 3, the first charging event can be a change in location of the UE from an area served by 4G radiocommunication service to an area served by 5G radiocommunication service and wherein the UE requests 5G radiocommunication service or any other desired change, e.g., a change in location or change in User Plane Function (UPF). In the embodiment of FIG. 3, another one of the one or more charging triggers is of either an immediate reporting category or a deferred reporting category and is associated with a second charging event. In the embodiment of FIG. 3, when the another one of the one or more charging triggers is of the immediate reporting category, the method can also include transmitting, by the node, a third charging data request after the second charging event occurs regardless of whether usage of an associated service has been requested by the UE. In the embodiment of FIG. 3, when the another one of the one or more charging triggers is of the deferred reporting category, the method can also include storing, by the node, information associated with an occurrence of the second charging event regardless of whether usage of an associated service has been requested by the UE. In the embodiment of FIG. 3, the node operates as a Session Management Function (SMF).

Another example of a method embodiment, from the perspective of, for example, the CHF 102 is shown in FIG. 4. Therein a method for charging in a radiocommunication system includes receiving 400, at a node in the radiocommunication system, a first charging data request message associated with a UE; transmitting 402, by the node in the radiocommunication system and in response to the first charging data request message, a charging data response message including one or more charging triggers, wherein at least one of the one or more charging triggers is of a usage reporting category and is associated with a first charging event; and receiving 404, at the node in the radiocommunication system, a second charging data request after both the first charging event occurs and usage of an associated service has been requested by the UE.

In the embodiment of FIG. 4, the first charging event can be a change in location of the UE from an area served by 4G radiocommunication service to an area served by 5G radiocommunication service and wherein the UE requests 5G radiocommunication service, or it can be any other change, e.g., a change in location or change in User Plane Function (UPF). In the embodiment of FIG. 4, another one of the one or more charging triggers can be of either an immediate reporting category or a deferred reporting category and is associated with a second charging event. If the another one of the one or more charging triggers is of the immediate reporting category, then the embodiment of FIG. 4 can also include receiving, by the node, a third charging data request after the second charging event occurs regardless of whether usage of an associated service has been requested by the UE. If the another one of the one or more charging triggers is of the deferred reporting category, then the embodiment of FIG. 4 can also include receiving, by the node, information associated with an occurrence of the second charging event regardless of whether usage of an associated service has been requested by the UE. In the embodiment of FIG. 4 the node operates as a Charging Function (CHF).

Various embodiments described herein refer in some fashion to nodes, e.g., nodes which support functions associated with charging. In some embodiments the non-limiting communication node (also interchangeably referred to as a node or a telecommunication node) is more commonly used and it refers to any type of network node which directly or indirectly communicates with a user equipment (UE), a node in one or more operator networks, and a core network.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 5:
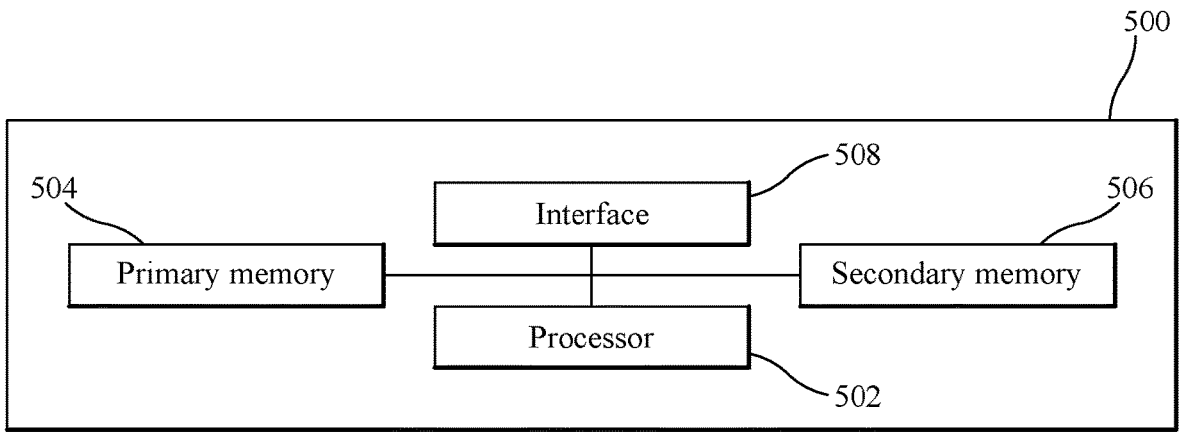
FIG. 5 illustrates a node.

Embodiments described above can be implemented in one or more nodes (or servers). An example of a communication node 500 is shown in FIG. 5. The communication node 500 (or other network node) includes a processor 502 for executing instructions and performing the functions described herein, e.g., the functions performed by the NF 100 and the CHF 102. The communication node 500 also includes a primary memory 504, e.g., random access memory (RAM) memory, a secondary memory 506 which can be a non-volatile memory, and an interface 508 for communicating with other portions of a network or among various nodes/servers in support of charging.

Processor 502 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 500 components, such as memory 504 and/or 506, node 500 functionality in support of the various embodiments described herein. For example, processor 502 may execute instructions stored in memory 504 and/or 506.

Primary memory 504 and secondary memory 506 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 504 and secondary memory 506 may store any suitable instructions, data or information, including software and encoded logic, utilized by node 500. Primary memory 504 and secondary memory 506 may be used to store any calculations made by processor 502 and/or any data received via interface 508.

Communication node 500 also includes communication interface 508 which may be used in the wired or wireless communication of signaling and/or data. For example, interface 508 may perform any formatting, coding, or translating that may be needed to allow communication node 500 to send and receive data over a wired connection. Interface 508 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

Figure 6:
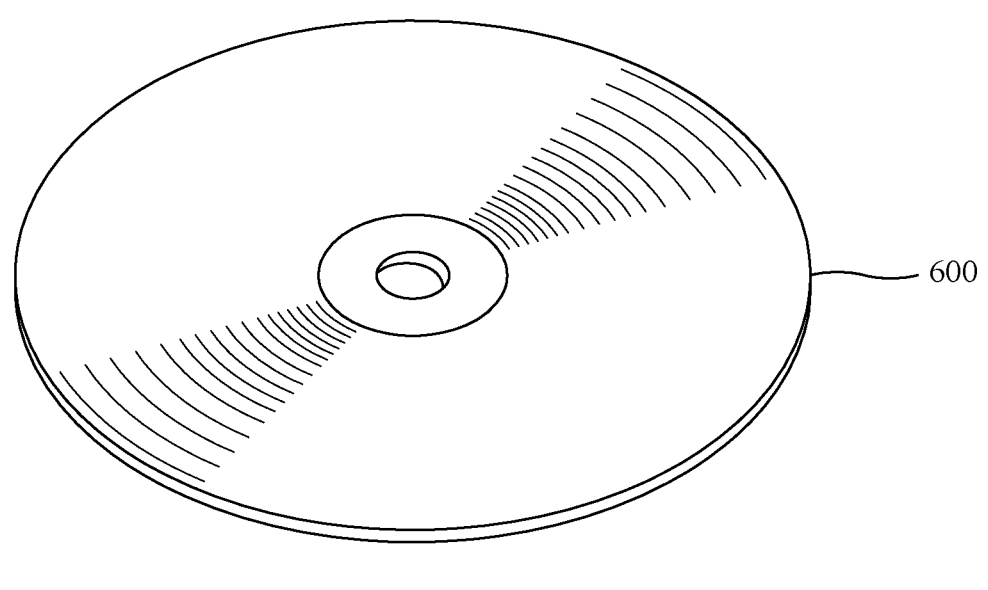
FIG. 6 depicts an electronic storage medium.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIGS. 3-4, may take the form of a computer program product stored on a computer-readable storage medium having computer-readable instructions embodied in the medium. For example, FIG. 6 depicts an electronic storage medium 600 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method of operating a node for charging in a radiocommunication system, the method comprising:
transmitting a first charging data request message associated with a user equipment ("UE");
responsive to transmitting the first charging data request message, receiving a charging data response message including one or more charging triggers, a first charging trigger of the one or more charging triggers being of a usage reporting category and being associated with a first charging event; and
transmitting a second charging data request after both the first charging event occurs and usage of an associated service has been requested by the UE.

2. The method of claim 1, wherein the first charging event is a change in location or a change in User Plane Function ("UPF").

3. The method of claim 1, wherein the first charging event is a change in location of the UE from an area served by fourth generation ("4G") radiocommunication service to an area served by fifth generation ("5G") radiocommunication service and wherein the UE requests 5G radiocommunication service.

4. The method of claim 1, wherein a second charging trigger of the one or more charging triggers is of either an immediate reporting category or a deferred reporting category and is associated with a second charging event.

5. The method of claim 4, wherein the second charging trigger is of the immediate reporting category,
the method further comprising:
transmitting a third charging data request after the second charging event occurs regardless of whether usage of an associated service has been requested by the UE.

6. The method of claim 4, wherein the second charging trigger is of the deferred reporting category,
the method further comprising:
storing information associated with an occurrence of the second charging event regardless of whether usage of an associated service has been requested by the UE.

7. The method of claim 1, wherein the node operates as a Session Management Function ("SMF").

8. A node in a radiocommunication system comprising:
processing circuitry; and
memory coupled to the processing circuitry and having instructions stored therein that are executable by the processing circuitry to cause the node to perform operations comprising:
transmitting a first charging data request message associated with a user equipment ("UE");

responsive to transmitting the first charging data request message, receiving a charging data response message including one or more charging triggers, a first charging trigger of the one or more charging triggers being of a usage reporting category and being associated with a first charging event; and transmitting a second charging data request after both the first charging event occurs and usage of an associated service has been requested by the UE.

9. The node of claim 8, wherein the first charging event is a change in location or a change in User Plane Function ("UPF").

10. The node of claim 8, wherein the first charging event is a change in location of the UE from an area served by fourth generation ("4G") radiocommunication service to an area served by fifth generation ("5G") radiocommunication service and wherein the UE requests 5G radiocommunication service.

11. The node of claim 8, wherein a second charging trigger of the one or more charging triggers is of either an immediate reporting category or a deferred reporting category and is associated with a second charging event.

12. The node of claim 11, wherein the second charging trigger is of the immediate reporting category, the operations further comprising:

transmitting a third charging data request after the second charging event occurs regardless of whether usage of an associated service has been requested by the UE.

13. The node of claim 11, wherein second charging trigger is of the deferred reporting category, the operations further comprising:

storing information associated with an occurrence of the second charging event regardless of whether usage of an associated service has been requested by the UE.

14. The node of claim 8, wherein the node operates as a Session Management Function ("SMF").

15. A method of operating a node for charging in a radiocommunication system, the method comprising:

receiving a first charging data request message associated with a user equipment ("UE");

responsive to receiving the first charging data request message, transmitting a charging data response message including one or more charging triggers, a first charging trigger of the one or more charging triggers being of a usage reporting category and being associated with a first charging event; and receiving a second charging data request after both the first charging event occurs and usage of an associated service has been requested by the UE.

16. The method of claim 15, wherein the first charging event is a change in location or a change in User Plane Function ("UPF").

17. The method of claim 15, wherein the first charging event is a change in location of the UE from an area served by fourth generation ("4G") radiocommunication service to an area served by fifth generation ("5G") radiocommunication service and wherein the UE requests 5G radiocommunication service.

18. The method of claim 15, wherein a second charging trigger of the one or more charging triggers is of either an immediate reporting category or a deferred reporting category and is associated with a second charging event.

19. The method of claim 18, wherein the second charging trigger of the one or more charging triggers is of the immediate reporting category, the method further comprising:

receiving a third charging data request after the second charging event occurs regardless of whether usage of an associated service has been requested by the UE.

20. The method of claim 18, wherein the second charging trigger of the one or more charging triggers is of the deferred reporting category, the method further comprising:

receiving information associated with an occurrence of the second charging event regardless of whether usage of an associated service has been requested by the UE.

21. The method of claim 15, wherein the node operates as a Charging Function ("CHF").

22. The method of claim 1, further comprising:

detecting the occurrence of the first charging event; and detecting usage of the associated service by the UE, wherein the second charging data request includes an indication of the first charging trigger that caused the second charging data request to be transmitted.

23. The node of claim 8, the operations further comprising:

detecting the occurrence of the first charging event; and detecting usage of the associated service by the UE, wherein the second charging data request includes an indication of the first charging trigger that caused the second charging data request to be transmitted.

24. The method of claim 15, wherein the second charging data request includes an indication of the first charging trigger that caused the second charging data request to be transmitted.

* * * * *